March 3, 1959  J. BELKOWSKI ET AL  2,875,768
AUXILIARY THRESHING AND CONVEYING UNIT
Filed Aug. 6, 1956  3 Sheets-Sheet 2

INVENTORS.
JERZY BELKOWSKI &
WALTER STANLEY HOCKEY
BY James E. Nilles
ATTORNEY.

March 3, 1959   J. BELKOWSKI ET AL   2,875,768
AUXILIARY THRESHING AND CONVEYING UNIT
Filed Aug. 6, 1956   3 Sheets-Sheet 3

INVENTORS.
JERZY BELKOWSKI &
WALTER STANLEY HOCKEY
BY James E. Nilles
ATTORNEY.

ID
2,875,768

AUXILIARY THRESHING AND CONVEYING UNIT

Jerzy Belkowski, Earlsdon, Coventry, and Walter Stanley Hockey, Stretton-on-Dunsmore, England, assignors to Massey-Ferguson Inc., a corporation of Maryland Application August 6, 1956, Serial No. 602,124

Claims priority, application Great Britain January 19, 1956

2 Claims. (Cl. 130—27)

This invention relates to agricultural machines and more specifically to threshing and separating mechanisms. The invention finds particular utility in harvester-threshers, more commonly referred to as combines.

In conventional combines, the clean grain is separated from the gleanings or tailings by means of a cleaning shoe, usually comprised of separating screens or sieves, and conveyed to a storage tank or bagger attachment on the machine. The tailings, that is the material left on the sieves is collected at another location, usually by a "tailings auger." These tailings comprise grain that is not completely threshed from the heads, green seeds, chaff, particles of straw or other refuse. It has been customary to convey these tailings back to the main thresher cylinder where it is deposited either ahead of the cylinder for rethreshing or immediately behind the cylinder if rethreshing appears unnecessary. In either case the material is then passed over the separating mechanism for separating the remaining grain from the refuse. If the main threshing cylinder has been properly adjusted as to speed and spacing from the concave, rethreshing will be unnecessary. At worst, very little rethreshing is absolutely necessary to insure complete separation of the grain.

To convey the tailings to the area of the main cylinder requires a conveyor which is expensive and unsightly to the general appearance of the machine. In other words, it is costly, detracts from the machine's appearance and takes up valuable space on the machine. Furthermore, by returning the tailings to the main cylinder, an additional load is placed thereon which reduces the capacity of the cylinder. In addition, much of the grain that is returned to the cylinder, or immediately behind it, is simply carried out the rear end of the machine with the straw on the straw walkers and thereby lost.

It is therefore an object of this invention to provide a compact and efficient mechanism for a thresher which will receive tailings that are discharged from the separating mechanism, provide the necessary threshing action and return them directly to the intake side of the cleaning shoe.

It is an object of this invention to provide a combined tailings auger, auxiliary thresher and conveyor which is adapted to receive tailings discharged by the cleaning shoe, subject them to a threshing action and return them directly to the intake side of the cleaning shoe.

It is a more specific object of this invention to provide a mechanism of the above type in which the tailings are fed into the auxiliary thresher by the auger in an axial direction and the thresher continues to move the tailings in an axial direction into the conveyor.

Other objects and advantages of this invention will become more apparent from the following detailed description and attached sheets of drawings wherein a form of the invention is illustrated. Accordingly, the present invention may be considered as comprising the various, constructions, combinations, or sub-combinations of parts as is hereinafter more fully set forth in the detailed description and in the claims, reference being had to the accompanying drawings in which:

Figure 1:
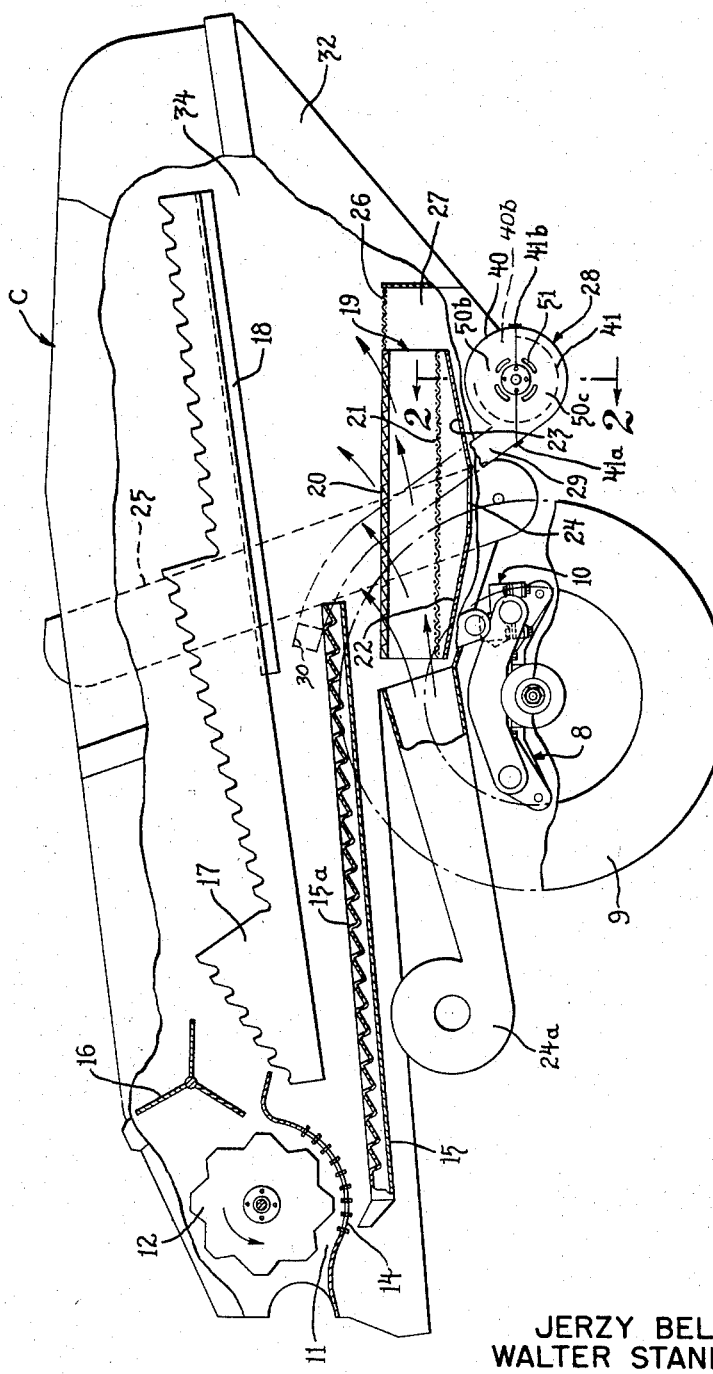
Figure 1 is a side elevational view, partially in section, and with parts broken away, showing part of a combine embodying the invention.

Referring more particularly to Figure 1, the threshing mechanism chosen for illustrative purposes is that of a combine which is adapted to be mounted on a tractor. More specifically the combine C is mounted on the axle-mounted extension 8 of a tractor (not otherwise shown). The extension 8 has a ground wheel 9 rotatably mounted on its near side, as viewed in Figure 1, and is secured at its other side to the tractor. For a more complete description of this type of mounting extension, if it is deemed necessary, reference may be had to the U. S. Patent Number 2,741,323, issued April 10, 1956 and entitled "Axle Mounting Extension." It is sufficient to say that the combine is secured to the extension at 10 and is positioned between wheel 9 and the tractor body. The combine is also adapted to be secured adjacent the front end of the tractor in any suitable manner.

The combine has the conventional main threshing cylinder 12 and concave 14 between which is fed at 11 the crop material. The greatest percentage of the threshing action takes place between this cylinder and concave and grain falls through the concave onto the reciprocating grain pan 15. This grain is urged rearwardly by the motion of the pan 15 and its serrated floor 15a which permits movement of the material in the rearward direction only. The straw from the cylinder 12 is stripped therefrom by the rear beater 16 and thrown upon the straw walkers 17 which are reciprocated to throw the straw rearwardly and shake out any remaining grain. The grain falling through the walkers 17 is received by the grain pan 15, either directly or via the forwardly inclined return pan 18. The straw is discharged from the walkers 17 out of the rear end of the machine.

The material thus collected by the grain pan comprises separated and unseparated grain, chaff, short pieces of straw and other refuse. This material is urged by the pan 15 onto the shaker shoe 19 which is a separating mechanism comprising a chaffer sieve 20, a grain sieve 21 directly below the sieve 20, a front floor 22 sloping downwardly to the rear, a rear floor 23 sloping downwardly towards the front and an opening 24 between these floors. The entire cleaning or shaking shoe 19 is reciprocated and serves to sift the grain from the remainder of the material that has been delivered to it.

A fanning mill 24a supplies a source of air which is blown in an upwardly and rearwardly direction, as indicated by the arrows, through the chaffer 20. The lighter material that has been delivered to the chaffer, such as chaff and straw particles, is blown rearwardly off the chaffer. The grain and other small material fall through the chaffer onto sieve 21. The grain also passes through the grain sieve 21 and through opening 24, where it is conveyed by the conventional "clean grain auger" (not shown) to the grain elevator 25 for storage elsewhere on the machine.

The material that has been propelled rearwardly off the chaffer 20 passes over the screen 26 and the smaller material passes therethrough into a compartment 27 while the larger material passes from the rear of the machine. Similarly, material which does not pass through the lower grain sieve 21 will fall into the compartment 27. The material collected in this compartment is referred to as gleanings or tailings.

With the exception of the extension mounting 8, the above described structure is largely conventional and well known.

In conventional machines, the tailings would be returned from compartment 27 usually by a tailings auger which in turn would deliver the material to another conveyor. This second conveyor usually extended forwardly along the outside of the machine and terminated in a spout portion which could be selectively set to return the tailings either ahead of or directly behind the main cylinder 12, as earlier mentioned. This elaborate conveyor system was costly, unsightly and occupied valuable space. Furthermore, the desirability of this vigorous rethreshing action was offset by the additional load it imposed on the machine.

In accordance with this invention and as will presently appear, means are provided for feeding the tailings into an auxiliary threshing cylinder which imparts only the necessary threshing action, if any, to the material. While being threshed the material is continually moved in an axial direction and is then fed into a fan conveyor which delivers the material directly to the closely adjacent cleaning shoe.

The combined thresher-conveyor unit is designated generally as 28 in Figure 1 and is located on the underside of the machine and in a transverse direction relative thereto. A delivery spout or conduit 29 directs the material from the unit through an opening 30 in the wall 32 and onto the rear end of the grain pan above the cleaning shoe 19. The unit is located between the side walls 32, 34 of the machine and is substantially co-extensive in length with the width of the cleaning shoe 19.

The elongated cylindrical casing for the unit comprises an upper half 40 which is rigidly secured to the combine wall 32, and a lower half or trough 41 which is detachably secured along its front and rear sides by conventional over-center clips 41a, 41b, respectively (Figure 1) to the upper half. An opening 40b in the upper half 40 extends over the complete length of the auger in a substantially 90 degree arc whose limits are defined by a vertical plane through the center of the auger and a horizontal plane extending rearwardly from the auger center. The shaft 42 is rotatably mounted at each end in the anti-friction bearing assemblies 43, 44 which are secured by bolt means 43a, 44a, to the end walls 43b, 44b, of the upper casing half 40. The shaft is driven by the belt-driven pulley 45 through a conventional slip-clutch 46.

Means are provided for moving tailings into the threshing mechanism as follows. Mounted on a portion of shaft 42 in a first portion of the casing, is the transverse conveyor in the form of the auger 47. The tailings which leave the rear end of the cleaning shoe 19 drop directly through opening 40b into the auger or slide down the shield portion 40a of upper casing half 40 and through opening 40b into the transverse conveyor 47.

Adjacent the transverse conveyor 47 and in axial alignment therewith, is the auxiliary threshing mechanism which includes a threshing cylinder mounted on another portion of shaft 42 in a second portion of the casing. The series of axially and circumferentially spaced fingers 48 of the cylinder extend through shaft 42 and are secured thereto by nuts 48a threadably engaged on the the finger ends.

Figure 3:
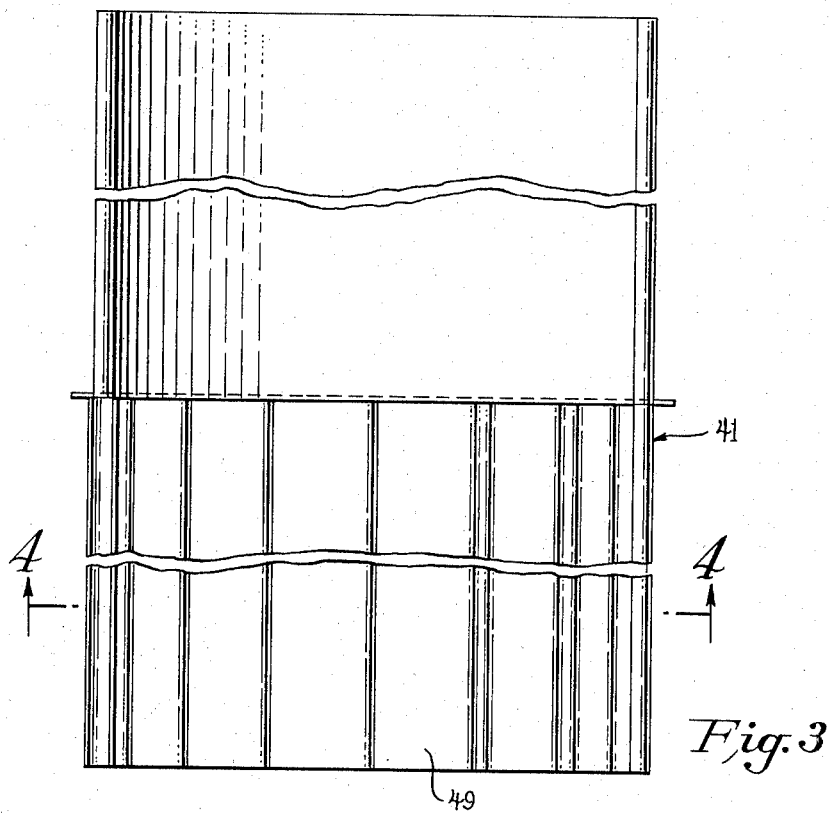
Figure 3 is a plan view on a further enlarged scale of the concave which forms the lower portion of the casing for the auxiliary cylinder.
Figure 4:
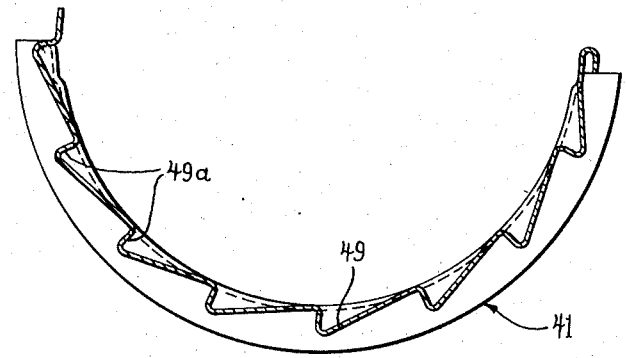
Figure 4 is an end view of the concave and taken generally on the line 4—4 of Figure 3.

As best shown in Figures 3 and 4, part of the lower casing portion 41 forms the concave portion 49 of the threshing mechanism and comprises a series of steps or corrugations 49a with which the fingers 48 cooperate to rub the grain from its heads and thereby complete the threshing action.

If the fingers were all set with no angle to their blade portions, they would have no tendency to urge the material in an axial direction. The requisite axial movement would instead be derived from a second conveyor or blower in the form of a fan 50 and fan housing 50a. Fan 50 is of the impeller type which is designed to draw air and material through its sides. The fan 50 is mounted on the shaft adjacent the thresher portion and comprises a series of radial arms 52 to which are bolted the rectangular crop engaging paddles 53. A cylindrical casing 50a surrounds the fan and has its upper half 50b secured to side wall 32 in any suitable manner. The lower half 50c of the fan casing is made integral with lower casing 41 for removal therewith in the event plugging occurs in the cylinder or fan or if service and maintenance are required. The spout 29 extends tangentially from the fan casing and is in material receiving communication therewith to receive material delivered by the paddles 53 and convey it a short distance to the shoe 19.

If additional air is required for the fan, other than that which it receives through the auxiliary thresher, air slots 51 may be provided in the outside wall 43b of the casing as shown in Figure 1. This extra air supply has been found to give more satisfactory performance under certain conditions and help to prevent choking of the auxiliary threshing mechanism.

Figure 2:
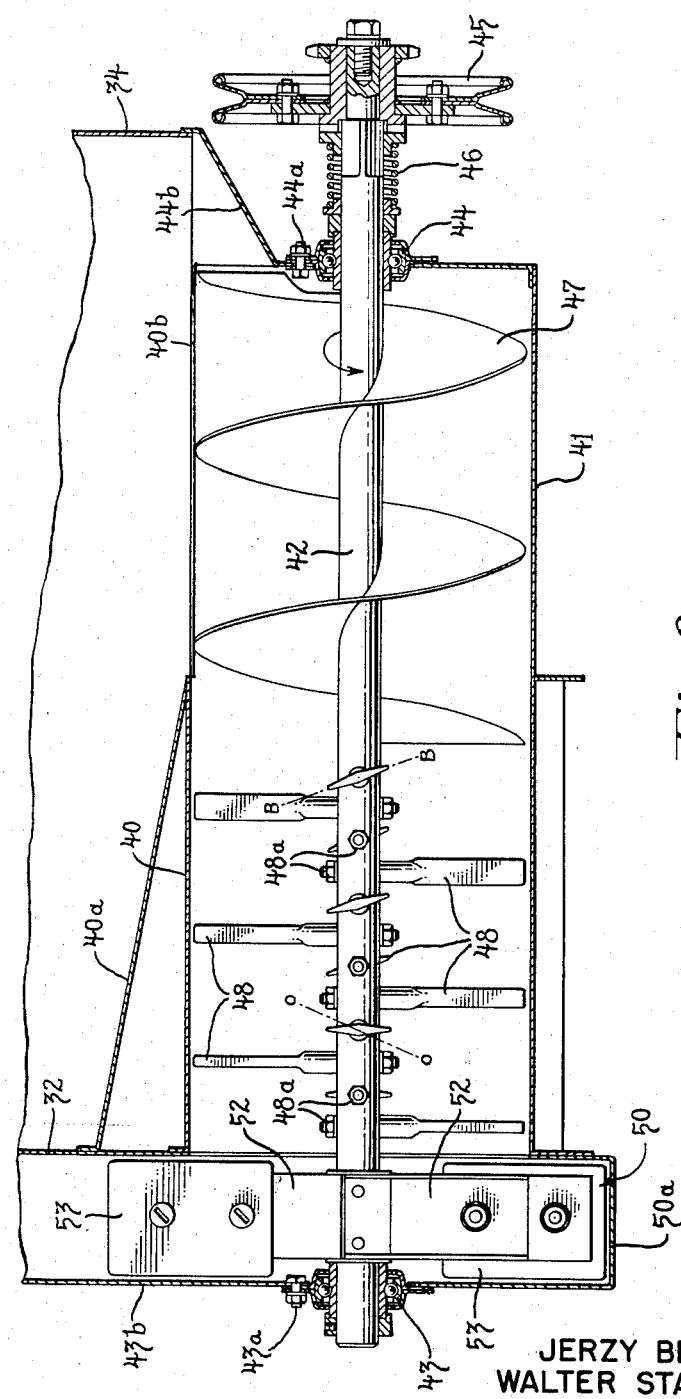
Figure 2 is a rear elevational view, on an enlarged scale and in section, taken on line 2—2 of Figure 1, of an auger-auxiliary cylinder-conveyor unit made in accordance with the invention.

The fingers extend radially from the shaft and the outer blade portions may be set so their planes B—B are angled to produce an axial feed to the gleanings to facilitate passage of the material through the thresher. Stated otherwise, the effect would be to assist the axial air induced feed to shorten the threshing action. Alternatively, the blades may be turned in the opposite direction as shown by plane 0—0 of Figure 2, to thereby oppose the air-induced feed in order to prolong the threshing action.

We claim:

1. In a threshing machine, the combination comprising, a cleaning shoe for cleaning harvested grain and operable to discharge tailings from one end thereof, a cylindrical casing positioned beneath said end of the shoe and extending across the width of the shoe, a journaled shaft disposed along the axis of said casing, an auger fixed to said shaft at one end of said casing, means for directing the discharged tailings to said auger, a plurality of axially spaced threshing blades extending radially from said shaft at the opposite end of said casing, a portion of the inner wall of the casing at said opposite end being axially corrugated and in close proximity to the outer ends of said blades, a cylindrical blower housing extending coaxially from and opening into said opposite end of the casing, blower blades disposed within said housing and fixed to said shaft, a discharge duct opening from said housing and extending up to said shoe, means for driving said shaft so as to feed tailings by said auger to said threshing blades, thresh the tailings, and discharge them on said shoe, said threshing blades being rotatable about axes extending radially from said shaft so that the blades may be set to feed, retard, or not effect the flow of tailings from the auger to the blower housing in accordance with the condition of the crop, and means for locking the individual blades in their set positions.

2. In a threshing machine, the combination comprising, a cleaning shoe for cleaning harvested grain and operable to discharge tailings from one end thereof, a cylindrical casing positioned beneath said end of the shoe and extending across the width of the shoe, a journaled shaft disposed along the axis of said casing, an auger fixed to said shaft at one end of said casing, means for directing the discharged tailings to said auger, a plurality of axially spaced threshing blades extending radially from said shaft at the opposite end of said casing, a portion of the inner wall of said casing at said opposite end being axially corrugated and in close proximity to the outer ends of said blades, said casing being formed in two parts so as to have a lower and an upper portion, said corrugated inner wall portion being disposed on the inner wall of said lower portion, means for locking the casing portions together while allowing removal of the lower portion for cleaning, adjusting, and servicing the interior parts, a cylindrical blower housing extending coaxially from and opening into said opposite end of the casing, blower blades disposed within said housing and fixed to said shaft, a discharge duct opening from said housing and extending up to said shoe, and means for driving said shaft so as to feed tailings by said auger to said threshing blades, thresh the tailings, and discharge them on said shoe.

References Cited in the file of this patent

UNITED STATES PATENTS

| | | |
|---|---|---|
| 551,500 | Landis | Dec. 17, 1895 |
| 688,823 | Bowers | Dec. 17, 1901 |
| 2,620,614 | McConnel et al. | Dec. 9, 1952 |